(12) United States Patent
Duque et al.

(10) Patent No.: US 12,000,149 B2
(45) Date of Patent: *Jun. 4, 2024

(54) ROOFING SYSTEMS UTILIZING CAP SHINGLES WITH SELF-SEALING ADHESIVES

(71) Applicant: BMIC LLC, Dallas, TX (US)

(72) Inventors: Luis Duque, Hackensack, NJ (US); Ming-Liang Shiao, Basking Ridge, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,742

(22) Filed: Mar. 17, 2023

(65) Prior Publication Data
US 2023/0220671 A1  Jul. 13, 2023

Related U.S. Application Data

(63) Continuation of application No. 17/680,454, filed on Feb. 25, 2022, now Pat. No. 11,608,638.

(Continued)

(51) Int. Cl.
*E04D 1/30* (2006.01)
*B32B 3/08* (2006.01)
(Continued)

(52) U.S. Cl.
CPC .............. *E04D 1/30* (2013.01); *B32B 3/08* (2013.01); *B32B 7/12* (2013.01); *E04D 1/28* (2013.01);
(Continued)

(58) Field of Classification Search
CPC .... B32B 3/06; B32B 3/08; B32B 5/02; B32B 5/022; B32B 5/024; B32B 5/26;
(Continued)

(56) References Cited

U.S. PATENT DOCUMENTS 1,685,999 A   2/1925   Harris
1,640,806 A   8/1927   Ritter
(Continued)

FOREIGN PATENT DOCUMENTS

CA    3023371 A1   11/2017

OTHER PUBLICATIONS

Photographic Image. Copyrighted 2010 by InspectAPedia.com.

*Primary Examiner* — James M Ference
(74) *Attorney, Agent, or Firm* — Womble Bond Dickinson (US) LLP

(57) ABSTRACT

A roofing system including a cap shingle and a method of producing a cap shingle are disclosed. In one embodiment, the cap shingle is formed with a continuous or discontinuous self-sealing adhesive that is applied along a ridgeline direction and can provide high wind resistance, without the use of hand-sealed adhesive application. In an embodiment of the method, one or more layers of a shingle material can be oriented in a machine direction with the self-sealing adhesive applied adjacent side edges of the shingle material to form the cap shingles having self-seal strips and configured to bend in the machine direction for installation of the cap shingles along a ridge of a roof.

12 Claims, 7 Drawing Sheets

Related U.S. Application Data

(60) Provisional application No. 63/154,018, filed on Feb. 26, 2021.

(51) Int. Cl.

| | |
|---|---|
| *B32B 7/12* | (2006.01) |
| *E04D 1/00* | (2006.01) |
| *E04D 1/28* | (2006.01) |
| *E04D 1/34* | (2006.01) |
| *B32B 5/02* | (2006.01) |
| *B32B 5/26* | (2006.01) |
| *B65G 57/00* | (2006.01) |

(52) U.S. Cl.
CPC ............ *E04D 1/29* (2019.08); *E04D 1/3402* (2013.01); *B32B 5/02* (2013.01); *B32B 5/26* (2013.01); *B32B 2250/20* (2013.01); *B32B 2260/021* (2013.01); *B32B 2260/04* (2013.01); *B32B 2405/00* (2013.01); *B32B 2419/06* (2013.01); *B65G 57/00* (2013.01); *E04D 2001/005* (2013.01); *E04D 2001/305* (2013.01); *E04D 2001/3435* (2013.01); *E04D 2001/3447* (2013.01); *E04D 2001/3461* (2013.01); *E04D 2001/3476* (2013.01); *E04D 2001/3491* (2013.01)

(58) Field of Classification Search
CPC ........... B32B 5/262; B32B 5/265; B32B 7/12; B32B 2250/20; B32B 2255/02; B32B 2255/26; B32B 2260/021; B32B 2260/04; B32B 2405/00; B32B 2419/06; B65G 57/00; E04D 1/22; E04D 1/28; E04D 1/29; E04D 1/30; E04D 1/3402; E04D 2001/005; E04D 2001/305; E04D 2001/3435; E04D 2001/3447; E04D 2001/3461; E04D 2001/3476; E04D 2001/3491
See application file for complete search history.

(56) References Cited

U.S. PATENT DOCUMENTS

| | | | |
|---|---|---|---|
| 1,771,990 A | 8/1930 | Bergner | |
| 2,031,993 A | 1/1932 | Varden | |
| 2,666,402 A * | 1/1954 | Clarvoe | E04D 1/26 106/284 |
| 3,003,906 A * | 10/1961 | Fasold | B05C 1/165 156/291 |
| 3,080,683 A * | 3/1963 | Sallie | E04D 1/26 206/447 |
| 3,138,897 A * | 6/1964 | McCorkle | E04D 1/29 427/186 |
| 3,239,992 A * | 3/1966 | Hodgson | E04D 1/29 156/291 |
| 3,247,631 A * | 4/1966 | Lovness | E04D 1/26 208/3 |
| 3,252,257 A * | 5/1966 | Price | E04D 1/26 52/518 |
| 3,641,932 A * | 2/1972 | Behringer | B41F 31/08 101/366 |
| 3,913,294 A | 10/1975 | Freiborg | |
| 4,189,886 A | 2/1980 | Frohlich et al. | |
| 4,287,846 A | 9/1981 | Klein | |
| 4,439,955 A | 4/1984 | Freiborg | |
| 4,470,237 A | 9/1984 | Lincoln et al. | |
| 4,835,929 A | 6/1989 | Bondoc et al. | |
| 5,094,042 A | 3/1992 | Freborg | |
| 5,122,095 A | 6/1992 | Wolfert | |
| 5,181,361 A * | 1/1993 | Hannah | E04D 1/2963 52/553 |
| 5,239,802 A | 8/1993 | Robinson | |
| 5,247,771 A | 9/1993 | Poplin | |
| 5,271,201 A | 12/1993 | Noone et al. | |
| 5,288,269 A | 2/1994 | Hansen | |
| 5,377,459 A | 1/1995 | Freiborg | |
| 5,405,647 A * | 4/1995 | Grubka | B05D 5/06 427/188 |
| 5,419,941 A | 5/1995 | Noone et al. | |
| 5,471,801 A | 12/1995 | Kupczyk et al. | |
| 5,575,876 A | 11/1996 | Noone et al. | |
| 5,693,142 A * | 12/1997 | Pedigrew | B42C 9/0012 412/37 |
| 5,916,103 A | 6/1999 | Roberts | |
| 5,921,863 A | 7/1999 | Sells | |
| 5,950,387 A * | 9/1999 | Stahl | E04D 1/29 52/748.1 |
| D422,095 S | 3/2000 | Thagard, III et al. | |
| 6,083,592 A * | 7/2000 | Chich | E04D 1/26 52/528 |
| 6,125,602 A | 10/2000 | Freiborg et al. | |
| 6,298,613 B1 | 10/2001 | Coulton et al. | |
| 6,305,138 B1 * | 10/2001 | Stahl | E04D 1/26 52/316 |
| 6,308,472 B1 | 10/2001 | Coulton et al. | |
| 6,351,913 B1 | 3/2002 | Freiborg et al. | |
| 6,361,434 B1 | 3/2002 | Brandon | |
| 6,449,910 B1 | 9/2002 | Budd | |
| 6,813,866 B2 | 11/2004 | Naipawer, III | |
| 6,895,724 B2 | 5/2005 | Naipawer, III | |
| 6,981,916 B2 | 1/2006 | Coulton | |
| 7,204,063 B2 * | 4/2007 | Kandalgaonkar | E04D 1/2918 52/551 |
| 7,594,363 B2 | 9/2009 | Polumbus et al. | |
| 7,604,536 B2 | 10/2009 | Coulton et al. | |
| 7,823,334 B2 | 11/2010 | Jolitz | |
| 7,921,606 B2 | 4/2011 | Quaranta et al. | |
| 8,137,757 B2 | 3/2012 | Collins et al. | |
| 8,240,100 B2 | 8/2012 | Kalkanoglu et al. | |
| 8,266,861 B2 * | 9/2012 | Koch | E04D 1/20 52/518 |
| 8,281,520 B2 | 10/2012 | Quaranta et al. | |
| 8,371,072 B1 | 2/2013 | Shanes et al. | |
| 8,371,085 B2 | 2/2013 | Koch | |
| 8,453,408 B2 | 6/2013 | Kalkanoglu et al. | |
| 8,613,165 B2 | 12/2013 | Bleil et al. | |
| 8,820,020 B2 | 9/2014 | Koch et al. | |
| 8,820,021 B2 | 9/2014 | Kalkanoglu et al. | |
| 8,839,576 B1 | 9/2014 | Newcomb | |
| 8,898,987 B1 * | 12/2014 | Amatruda | E04D 1/28 52/557 |
| 8,915,037 B2 | 12/2014 | Jenkins | |
| 9,017,791 B2 | 4/2015 | Grubka et al. | |
| 9,097,020 B2 | 8/2015 | Grubka et al. | |
| 9,151,055 B2 | 10/2015 | Grubka | |
| 9,200,453 B2 | 12/2015 | Kerwood-Winslow | |
| 9,290,938 B2 | 3/2016 | Kelly | |
| 9,290,943 B2 | 3/2016 | Grubka et al. | |
| 9,303,410 B2 | 4/2016 | Steffes et al. | |
| 9,428,916 B2 | 8/2016 | Railkar et al. | |
| 9,482,007 B2 | 11/2016 | Grubka et al. | |
| 9,650,787 B2 | 5/2017 | Montojo et al. | |
| 9,758,970 B2 | 9/2017 | Grubka et al. | |
| 9,795,981 B2 | 10/2017 | Svec | |
| 10,196,823 B2 | 2/2019 | Rotten | |
| 10,253,502 B2 * | 4/2019 | Grube | B05C 19/00 |
| 10,358,824 B2 | 7/2019 | Aschenbeck et al. | |
| 10,538,918 B2 | 1/2020 | Aschenbeck et al. | |
| 10,544,590 B2 | 1/2020 | Jenkins | |
| 10,787,814 B2 | 9/2020 | Duque | |
| 10,907,352 B2 | 2/2021 | Aschenbeck et al. | |
| 11,203,871 B2 | 12/2021 | Duque et al. | |
| 11,346,108 B2 * | 5/2022 | Leitch | E04D 1/2918 |
| 11,377,312 B2 * | 7/2022 | Belt | B32B 5/022 |
| 11,447,953 B2 * | 9/2022 | Haynes | E04D 1/2918 |
| 11,473,305 B2 * | 10/2022 | LaTorre | C08K 5/01 |
| 11,608,638 B2 * | 3/2023 | Duque | E04D 1/28 |
| 2002/0000068 A1 | 1/2002 | Freiborg et al. | |
| 2002/0032000 A1 | 3/2002 | Lawless, III et al. | |
| 2003/0093958 A1 | 5/2003 | Freiborg et al. | |

(56) References Cited

U.S. PATENT DOCUMENTS

| | | | |
|---|---|---|---|
| 2003/0215594 A1* | 11/2003 | Hamdar | B41M 3/006 428/40.1 |
| 2004/0206012 A1 | 10/2004 | Pressutti et al. | |
| 2005/0126088 A1 | 6/2005 | Rotter | |
| 2005/0166510 A1* | 8/2005 | Aschenbeck | D06N 5/00 52/741.1 |
| 2005/0193673 A1 | 9/2005 | Rodrigues et al. | |
| 2006/0096189 A1 | 5/2006 | Pavlansky et al. | |
| 2006/0201094 A1 | 9/2006 | Lassiter | |
| 2006/0265990 A1* | 11/2006 | Kalkanoglu | E04D 1/26 52/518 |
| 2007/0011978 A1 | 1/2007 | Kalkanoglu et al. | |
| 2007/0266665 A1* | 11/2007 | Todd | E04D 1/30 52/518 |
| 2008/0220714 A1 | 9/2008 | Caruso et al. | |
| 2009/0038257 A1 | 2/2009 | Todd et al. | |
| 2009/0110818 A1 | 4/2009 | Teng et al. | |
| 2010/0192500 A1 | 8/2010 | Koch | |
| 2010/0192501 A1 | 8/2010 | Koch et al. | |
| 2010/0212246 A1 | 8/2010 | Grubka | |
| 2011/0005158 A1 | 1/2011 | Kailey et al. | |
| 2011/0041446 A1* | 2/2011 | Stephens | E04D 1/265 427/208.4 |
| 2011/0061326 A1* | 3/2011 | Jenkins | E04D 1/20 52/518 |
| 2011/0126485 A1 | 6/2011 | Bleil et al. | |
| 2011/0151170 A1 | 6/2011 | Grubka et al. | |
| 2012/0174517 A1 | 7/2012 | Jenkins | |
| 2013/0025225 A1* | 1/2013 | Vermilion | E04D 1/26 52/518 |
| 2013/0042540 A1 | 2/2013 | Atchley | |
| 2014/0179220 A1 | 6/2014 | Railkar et al. | |
| 2015/0089895 A1* | 4/2015 | Leitch | E04D 1/26 52/518 |
| 2015/0240496 A1 | 8/2015 | Grubka et al. | |
| 2016/0024792 A1 | 1/2016 | Grubka et al. | |
| 2016/0186438 A1 | 6/2016 | Montojo et al. | |
| 2017/0058528 A1* | 3/2017 | Verhoff | E04D 1/28 |
| 2017/0321423 A1* | 11/2017 | Aschenbeck | E04D 1/26 |
| 2018/0030732 A1 | 2/2018 | Duque et al. | |
| 2018/0087274 A1 | 3/2018 | Grubka et al. | |
| 2018/0163405 A1 | 6/2018 | Grubka | |
| 2019/0360208 A1* | 11/2019 | Collins | E04D 1/20 |
| 2020/0040582 A1 | 2/2020 | Boss et al. | |
| 2020/0190804 A1 | 6/2020 | Haynes et al. | |
| 2020/0325684 A1 | 10/2020 | Duque et al. | |
| 2021/0108416 A1 | 4/2021 | Aschenbeck et al. | |
| 2021/0214945 A1* | 7/2021 | Leitch | E04D 1/26 |
| 2021/0276036 A1* | 9/2021 | Svec | B05C 9/06 |
| 2021/0285217 A1* | 9/2021 | Grubka | E04D 1/28 |
| 2021/0381241 A1* | 12/2021 | Vermilion | B32B 37/24 |
| 2022/0081906 A1 | 3/2022 | Leitch | |
| 2022/0178143 A1 | 6/2022 | Duque et al. | |
| 2022/0268025 A1* | 8/2022 | Smith | E04D 1/20 |
| 2022/0275645 A1* | 9/2022 | Duque | E04D 1/30 |
| 2022/0282487 A1* | 9/2022 | Leitch | E04D 1/2918 |
| 2023/0220671 A1* | 7/2023 | Duque | B32B 5/022 52/518 |

* cited by examiner

ROOFING SYSTEMS UTILIZING CAP SHINGLES WITH SELF-SEALING ADHESIVES

CROSS-REFERENCE TO RELATED APPLICATION

The present application is a continuation of U.S. patent application Ser. No. 17/680,454, filed Feb. 25, 2022, which claims benefit of U.S. Provisional Patent Application No. 63/154,018, filed Feb. 26, 2021.

INCORPORATED BY REFERENCE

The disclosures and figures of U.S. patent application Ser. No. 17/680,454, filed Feb. 25, 2022 and of U.S. Provisional Patent Application No. 63/154,018, filed Feb. 26, 2021, are incorporated by reference herein for all purposes as if set forth in their entireties.

TECHNICAL FIELD

This disclosure relates generally to roofing systems and in particular to roof systems having shingles, including cap shingles adapted to fit over a ridge, hip or cap of a roof, and methods of making such shingles. Other aspects also are described.

RELATED ART

Cap shingles generally are used in roofing applications along the ridge and hip areas of a roof. Once installed, cap shingles will be exposed to wind forces, and their wind resistance may depend on the type and application of adhesives thereto. Typically, cap shingles are produced with an adhesive that is applied along a lower surface thereof. As a result, the sides of the cap shingle will not have any adhesive, which can leave these sections with less protection to withstand wind forces. Further, to achieve wind resistance to speeds of 110 mph, the cap shingles must be installed with an additional step involving the application of an adhesive in the headlap portion along the ridgeline of the ridge cap. Application of such additional adhesive is generally done by hand during the installation of the cap shingles. The correct application of this hand-applied adhesive, its durability, and resistance are critical for performance when exposed to high wind forces, as failures can occur due to a wind-induced bubble effect that can develop in sections of the cap shingles that are not sufficiently attached to the roof, either by nails or adhesive.

Accordingly, it can be seen that a need exists for cap shingles that can provide high wind resistance, without the need of hand—applied adhesives during installation. The present disclosure address these and other related and unrelated problems in the art.

SUMMARY

Briefly described, according to one aspect, a roof system includes a shingle, which, in embodiments, comprises a cap shingle with a substantially continuous or and/or a discontinuous self-sealing adhesive that is applied along a ridgeline direction of the shingles. The shingles are configured to be exposed to weather (e.g. wind, rain, snow, heat, cold, sunlight (including ultraviolet (UV) light, visible light, infrared (IR) light), hail and other impacts, etc. . . . ), including providing high wind resistance without the use of hand-sealed adhesive applications.

In addition, a method for producing a cap shingle can include orienting a web of shingle material and a self-sealing adhesive in the same direction, the self-sealing adhesive is applied along the shingle material e.g. in a ridgeline direction of the cap shingle, which does not require the need for registration thereof during the manufacturing process, including registration with one or more chop-cutters for separating the shingle material to form individual cap shingles, or where multiple cap shingles are formed together as a sheet, for forming perforation or tear lines or cuts along which individual cap shingles can be separated into individual ones from the sheet of multiple cap shingles by the roofers during its installation. Eliminating such need of registration during manufacturing process may help to increase production speeds for manufacture of such cap shingles.

Various aspects of shingles, roof systems utilizing such shingles and methods for producing such shingles are provided, and according to one aspect include, without limitation, a cap shingle comprising a first layer of shingle material having first and second side edges, a front edge, a back edge; an exposure portion, and a headlap portion adjacent the back edge defining an upper surface of the cap shingle; a second layer of shingle material positioned beneath the first layer; the second layer defining a lower surface of the cap shingle; wherein the first and second layers of shingle material are configured to bend in an arc along an axis in a ridgeline direction extending from the back edge to the front edge for installation along a ridge, hip, or rake of a roof; and an adhesive applied to the lower surface of the cap shingle; wherein the adhesive is applied adjacent both the first and second side edges of the first layer of shingle material in a ridgeline direction of the cap shingle.

In embodiments of the cap shingle, the adhesive applied adjacent the first and second side edges of the first layer of shingle material comprises a substantially continuous strip of a self-sealing adhesive. In some embodiments, the adhesive applied adjacent first and second side edges of the layer of shingle material comprises a discontinuous pattern of a self-sealing adhesive.

In embodiments of the cap shingle, the adhesive comprises a self-sealing adhesive including asphalt, filled asphalt, polymer modified asphalts; bitumen, pressure sensitive adhesives (PSA), acrylic adhesives, butyl adhesives or combinations thereof. In some embodiments, the adhesive comprises an additive including tackifiers, stabilizers, calcium carbonates, limestone fillers, graphite's, intumescent additives, viscosity modified, oils, adhesion promoters, or combinations thereof.

In embodiments of the cap shingle, adhesive has a tackiness at temperatures above 70° F., and in some embodiments, the adhesive has a tackiness at temperatures above 40° F.

According to other aspects of the disclosure, a shingle is provided, comprising a layer of shingle material including an upper surface having a headlap portion adapted to be overlapped by at least one additional shingle arranged along a cap of a roof, and an exposure portion adapted to be exposed to weather, a lower surface opposite the upper surface, and first and second side edges; and at least one a self-seal strip applied to the lower surface of the layer of shingle material, adjacent each of the first and second side edges of the layer of shingle material; wherein the self-seal strip is positioned in registration with the first and second side edges of the layer of shingle material so that the self-seal strip is located at selected positions relative to a length of the shingle, or relative to tooth positions of the layer of shingle material, or relative to a shape of a backer applied to the layer of shingle material, or a combination thereof.

In embodiments of the shingle, the self-seal strips comprise a plurality of sealing features including a substantially continuous strip of self-sealing adhesive, a discontinuous pattern of self-sealing adhesive, or combination thereof.

In some embodiments, the self-seal strips comprise a self-sealing adhesive including asphalt, filled asphalt, polymer modified asphalts; bitumen, PSA, acrylic adhesives, butyl adhesives or combinations thereof.

According to another aspect of the disclosure, a method is provided, comprising (a) moving a web of shingle material along a path in a machine direction; (b) applying a self-sealing adhesive to a surface of the web of shingle material to form self-seal strips extending along the surface of the web of shingle material adjacent side edges thereof, wherein the self-seal strips are aligned in the machine direction; and (c) cutting the web of shingle material in synchronization with step (b) to form cap shingles having self-seal strips and configured to bend in the machine direction for installation of the cap shingles along a ridgeline of a ridge, hip or cap of a roof.

In embodiments, the method further comprises applying granules to an opposite surface of the web of shingle material, wherein the opposite surface of the web of shingle material with the granules applied thereto is configured to define an exposure portion and a headlap portion of each of the cap shingles.

In some embodiments of the method, applying the granules comprises applying the granules substantially continuously to the moving web of shingle material such that the granules are applied along both the headlap portion and exposure portion of the cap shingles.

In embodiments, the method, further comprises applying a release tape along the self-seal strips to cover the self-seal strips, and stacking the cap shingles to form a bundle with the cap shingles arranged with a release tape covered self-seal strip of one cap shingle facing a release tape covered self-seal strip of another cap shingle.

In still another aspect, a roof comprises a plurality of cap shingles arranged in series in a ridgeline direction along a ridge or cap of the roof, each of the cap shingles comprising at least one layer of shingle material having an upper surface, a lower surface and side edges; the upper surface of the at least one layer of shingle material including a headlap portion and an exposure portion of the cap shingle; and self-seal strips disposed along the lower surface of the at least one layer of shingle material; wherein the self-seal strips are applied to the lower surface adjacent the side edges of the cap shingle, and extend along the side edges of the cap shingle in a ridgeline direction thereof; wherein the cap shingles are configured to bend along the ridgeline direction for installation of the cap shingles along the ridge, hip or cap of the roof, and are attached to the roof on opposite sides of the ridge, hip or cap.

In embodiments of the roof, the self-seal strips include sealing features that vary along the length of the self-seal strip; and in some embodiments, the self-seal strips are located at predetermined positions along the shingle or overlapping shingles.

In embodiments of the roof, the self-seal strips comprise a self-sealing adhesive, including asphalt, filled asphalt, polymer modified asphalts; bitumen, PSA, acrylic adhesives, butyl adhesives or combinations thereof.

In embodiments of the roof, the self-seal strips comprise a plurality of sealing features including a substantially continuous strip of self-sealing, material, a discontinuous pattern of a self-sealing adhesive, or combination thereof.

Accordingly, embodiments of shingles, and in particular cap shingles configured to fit over a ridge, hip or cap of a roof; roof systems, and methods for forming cap shingles materials that are directed to the above discussed and other aspects are disclosed. The foregoing and other advantages and aspects of the embodiments of the present disclosure will become apparent and more readily appreciated from the following detailed description and the claims, taken in conjunction with the accompanying drawings. Moreover, it is to be understood that both the foregoing summary of the disclosure and the following detailed description are exemplary and intended to provide further explanation without limiting the scope of the present disclosure.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

DETAILED DESCRIPTION

The embodiments of the present disclosure will now be described in more detail with reference to the attached drawing figures.

Figure 1A:
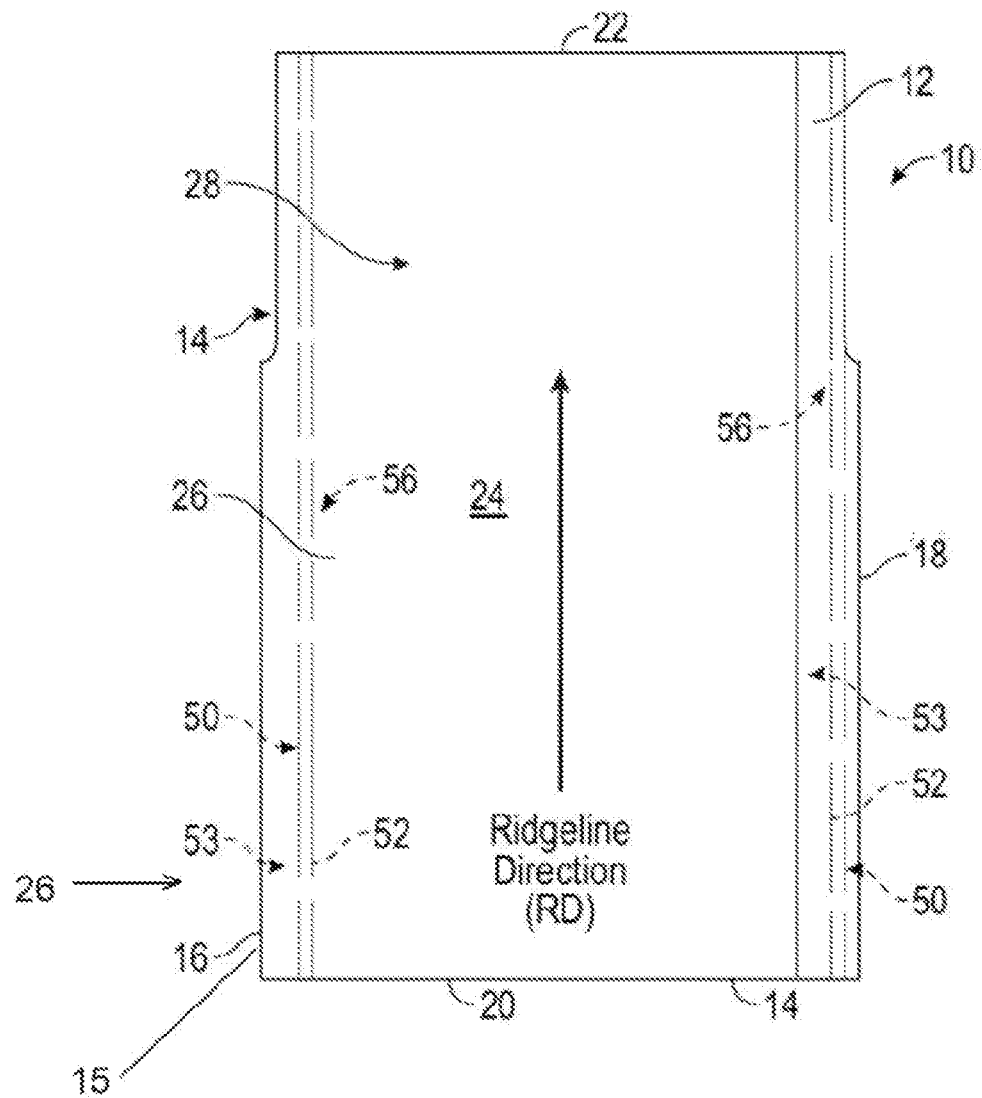
FIG. 1A shows a cap shingle according to one embodiment of the present disclosure.
Figure 1B:
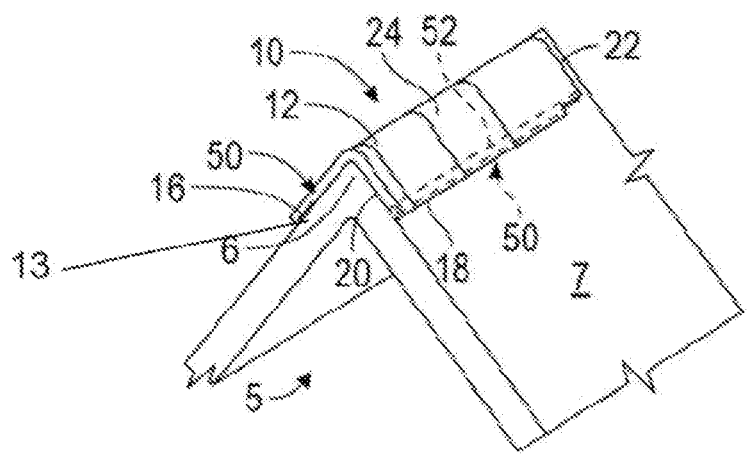
FIG. 1B shows the cap shingle of FIG. 1A applied along a ridge, hip or cap of a roof.

FIGS. 1A-6 show embodiments of shingles, including cap shingles roof systems employing shingles and methods of forming cap shingles according to the present disclosure. As shown in FIG. 1A, in embodiments, the shingles 10 comprise cap shingles 12, for example, ridge, hip or cap shingles are configured for installation on a roof 5, positioned over and along a ridge 6, cap, or hip of the roof, as indicated in FIG. 1B, as part of a roof system. It will also be understood that the roof system may include other roofing materials including, but not limited to, other roofing types of shingles, roofing membranes, roofing tiles, etc. The cap shingles 12 illustrated in the figures are configured to be positioned over a roof deck 7 or roofing structure of the roof, such as by being placed onto an upper surface of the roof deck of the roof, and arranged in an overlapping relationship along a ridgeline direction (RD) of the roof; with the cap shingles bending over and covering the ridge 6, hip or cap of the roof. The shingles can be secured by adhesives or sealant materials, fasteners, connectors, other attachments, or combinations thereof.

In embodiments, the shingles formed according to the principles of the present disclosure will comprise cap shingles 12 such as shown in FIG. 1A, which are configured to withstand exposure to weather, including exposure to wind, rain, snow, extreme temperatures (e.g. above 100 F° and extreme cold (e.g. below 0 F°. The cap shingles further are configured to withstand substantial forces due to wind uplift forces from high wind speeds of up to 110 mph (Class F in ASTM D3161), and in some embodiments, wind uplift forces from high wind speeds of up to 155 mph (Class G in ASTM D7158) when tested in accordance with ASTM D3161 (the Standard Test Method for Wind Resistance of Steep Slope Roofing Products (Fan-Induced Method)) and/or ASTM D7158 (the Standard Test Method for Wind Resistance of Sealed Asphalt Shingles (Uplift Force/Uplift Resistance Method).

For purposes of illustration and not limitation, FIG. 1A illustrates a single cap shingle 12. It will also be understood that the cap shingles 12 can be formed as a sheet 8 including multiple cap shingles 12 with perforation or tear lines (as indicated at 121 in FIGS. 2A-2B) separating the individual cap shingles. Multiple cap shingles can be provided in separable sheets for ease of transport.

In embodiments, as indicated in FIG. 1A, each cap shingle 12 includes at least a one layer of shingle material 14. In one embodiment, the cap shingle 12 can be made with a single layer fabric, and in other embodiments, the cap shingle 12 can be made with more than one layer, with the layer of shingle material 14 comprising a first layer and with a second layer and/or additional layers applied thereto. For example, the cap shingles 12 can include a laminated, double-layer fabric.

As further indicated in FIG. 1A, the layer of shingle material 14 has first 16 and second 18 side edges and front 20 and back 22 edges. The layer of shingle material 14 further includes an upper surface 24 having an exposure portion 26, and a headlap portion 28. The upper surface 24 can have a granulated surface or appearance, such as inducing a plurality of granulated roofing materials, or can incorporate additional materials for protection against exposure to weather (e.g. wind, rain, snow, heat, cold, sunlight (including ultraviolet (UV) light, visible light, infrared (IR) light), hail and other impacts, etc. . . . ), and/or to provide an aesthetic appearance. The headlap portion 28 is adjacent or proximate the back edge 22, and is configured to be overlapped by at least one additional cap shingle 12 or other roofing shingle arranged in a next higher course of shingles along the roof. The exposure portion 26 is configured to be exposed to weather.

The layer of shingle material 14 further includes a lower surface 54 (FIG. 2A), and in some embodiments, additional lower layers of shingle material can be applied along the lower surface 54, each of such lower layers configured to bend in an arc along an axis extending in a ridgeline direction (RD) extending from the back edge 22 to the front edge 20 for installation along a ridge, hip, or rake of a roof.

In the embodiment illustrated in FIG. 1A, the layer of shingle material 14 includes an adhesive 50 (indicated in dashed lines) that is applied adjacent the first 16 and second side 18 edges thereof on the lower surface 54. In one embodiment, the adhesive 50 comprises a substantially continuous strip of a self-sealing adhesive defining a self-seal strip 52 (indicated in dashed lines).

Figure 2A:
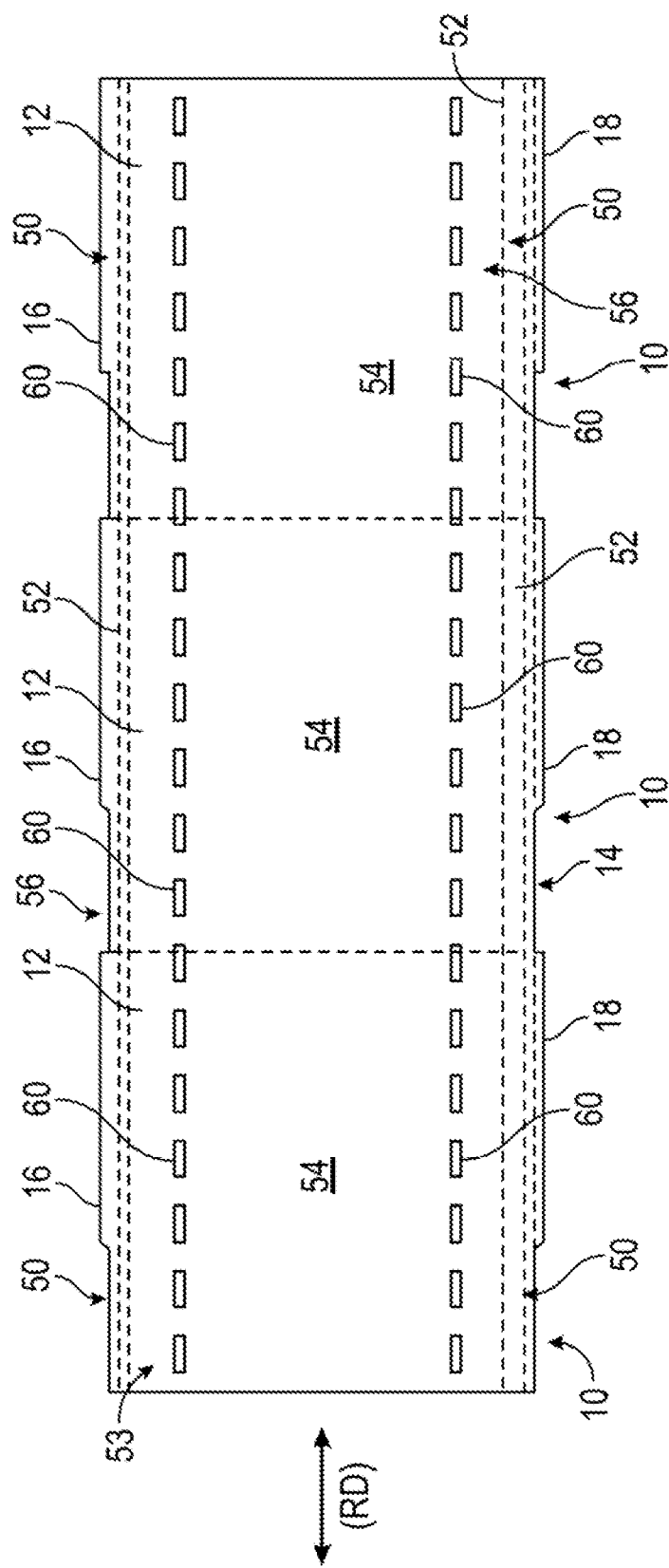
FIG. 2A shows a sheet of cap shingles of FIG. 1A formed with perforation or tear lines configured for separation of individual cap shingles from the sheet of cap shingles according to an additional embodiment of the present disclosure.
Figure 2B:
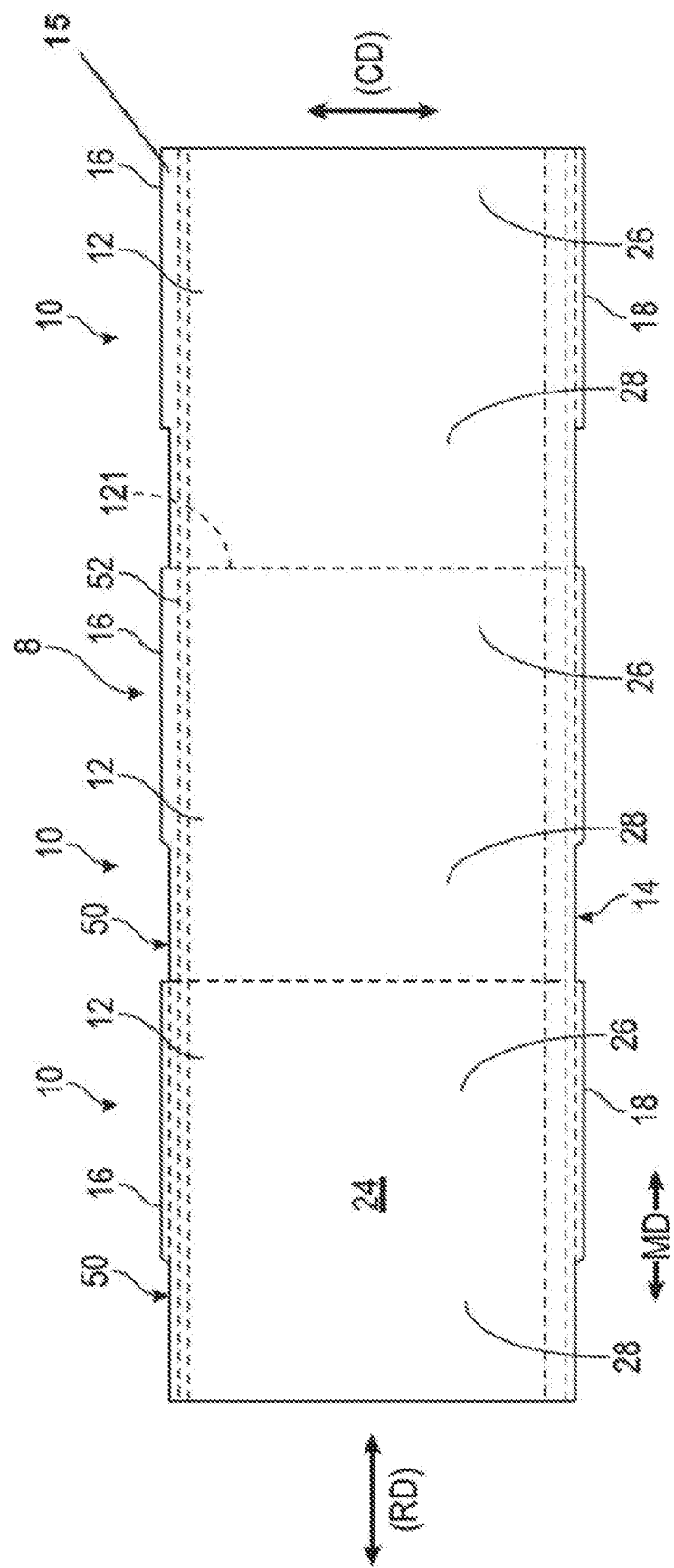
FIG. 2B is a top plan view the sheet of cap shingles of FIG. 2A.

FIGS. 2A and 2B illustrate bottom and top plan views of a sheet of multiple cap shingles 12 according to embodiments of the present disclosure. As indicated in FIG. 2A, the self-seal strips 52 will be applied to a lower surface 54 of the cap shingle 12, disposed adjacent and along the first 16 and second side 18 edges. The self-seal strips 52 can define a plurality of sealant features 56 along the lower surface 54 of the cap shingle 12. The self-seal strips 52 further will be configured to be in registration with the first and second side edges of the cap shingle 12 along the ridgeline direction (RD) so that the sealant features 56 are located at selected positions relative to the length of the cap shingle 12, or relative to tooth positions of the cap shingle 12 (e.g. positions of teeth or other shapes formed along the exposure portion of the cap shingle), or relative to a shape of a backer applied to the cap shingle 12.

The layer of shingle material 14 also can include a strip or layer of a releasable covering such as a release tape 53 applied thereto. The release tape can include a thin sheet or film of a plastic or other, similar material that can be applied over the self-seal strips without substantially adhering to or interfering with the self-seal strips; providing protection to the self-seal strips and helping to prevent the self-sealing adhesive thereof from adhering to an adjacent cap shingle during storage and/or transport of the cap shingles, while also allowing for easy removal from the self-seal strip without disturbing or pulling the self-sealing adhesive therewith.

In an embodiment, as shown in FIG. 2A, the layer of shingle material 14 is shown to have a plurality of additional sealant or self-sealing adhesive lines 60 along the sides thereof, such that the shingles 12 can also be sealed in the cross-ridgeline (CD) direction for high wind resistance to wind blowing along the ridgeline direction. In this regard, FIG. 2A shows that the layer of shingle material 12 can have dual, generally parallel additional sealant lines 60 configured for sealing along the side of the shingle in the ridgeline (RD) and in the cross-ridgeline directions (CD).

The sealing features of the self-seal strip(s) 52 and/or the additional sealant lines 60 can vary along the length thereof. In this regard, in embodiments, the sealing features of each self-seal strip 52 or additional sealant lines 60 can comprise continuous lines of self-sealing adhesive. In other embodiments, the sealing features can include a discontinuous pattern of a self-sealing adhesive. For example, the adhesive of the self-seal strips and additional sealant lines 60 can be applied in discontinuous or dotted patterns along the first 16 and second side 18 edges of the layer of shingle material 14. Accordingly, water infiltrating under the cap shingle 12 can be drained out of gaps or spaces defined between portions of the discontinuous or dotted pattern(s) of the self-seal strips and/or the additional sealant lines.

According to embodiments of the present disclosure, with the placement of the self-seal strips of self-sealing adhesive along the side edges of the cap shingles, the cap shingle can have high wind resistance, and can be adhered along both sides of the ridgeline of a roof when installed. Moreover, the full side edges of the cap shingles can be sealed opposite sides of along the ridgeline of the roof, such that high wind resistance sufficient to withstand wind uplift forces from high wind speeds of 110 mph (Class F in ASTM D3161), and in some embodiments, wind uplift forces from high wind speeds of up to 155 mph (Class G in ASTM D7158) in accordance with ASTM D3161 and/or D7158 can be achieved, without the need to hand seal the side edges of the cap shingles.

In embodiments, the adhesive, of the self-seal strips and/or additional sealant lines can comprise a self-sealing adhesive including asphalt, filled asphalt, polymer modified asphalts; bitumen, PSA, acrylic adhesives, butyl adhesives or combinations thereof. In embodiments, the adhesive comprises a self-sealing adhesive including an additive including tackifiers, stabilizers, calcium carbonates, limestone fillers, graphites, intumescent additives, viscosity modified, oils, adhesion promoters, or combinations thereof. In one embodiment, the adhesive has a tackiness at temperatures above 70° F. In one embodiment, the adhesive has a tackiness at temperatures above 65° F. In one embodiment, the adhesive has a tackiness at temperatures above 60° F. In one embodiment, the adhesive has a tackiness at temperatures above 55° F. In one embodiment, the adhesive has a tackiness at temperatures above 50° F. In one embodiment, the adhesive has a tackiness at temperatures above 45° F. In one embodiment, for example, such as for cold weather installations, the adhesive has a tackiness at temperatures above 40° F. Other adhesive materials with a tackiness less than 40° F. also can be used.

According to the present disclosure, a method for forming a cap shingle 12 is provided. The method can include moving a ribbon or web of a shingle material 102 along a path 114, progressively applying self-sealing adhesive 50 to a surface of the moving web of the shingle material 102 to form a self-seal strip 52. In embodiments, a self-seal strip is applied adjacent the side edges of the web of shingle material, self-seal strip also can have continuous or varying features along its length, and repeatedly cutting the web of shingle material 102 in synchronization with progressively applying self-sealing adhesive to form roofing shingles 12 having self-seal strips 52 with features located in a ridgeline direction along each cap shingle at predetermined positions with respect to a length of each cap shingle 12 (FIGS. 3-5).

Figure 3:
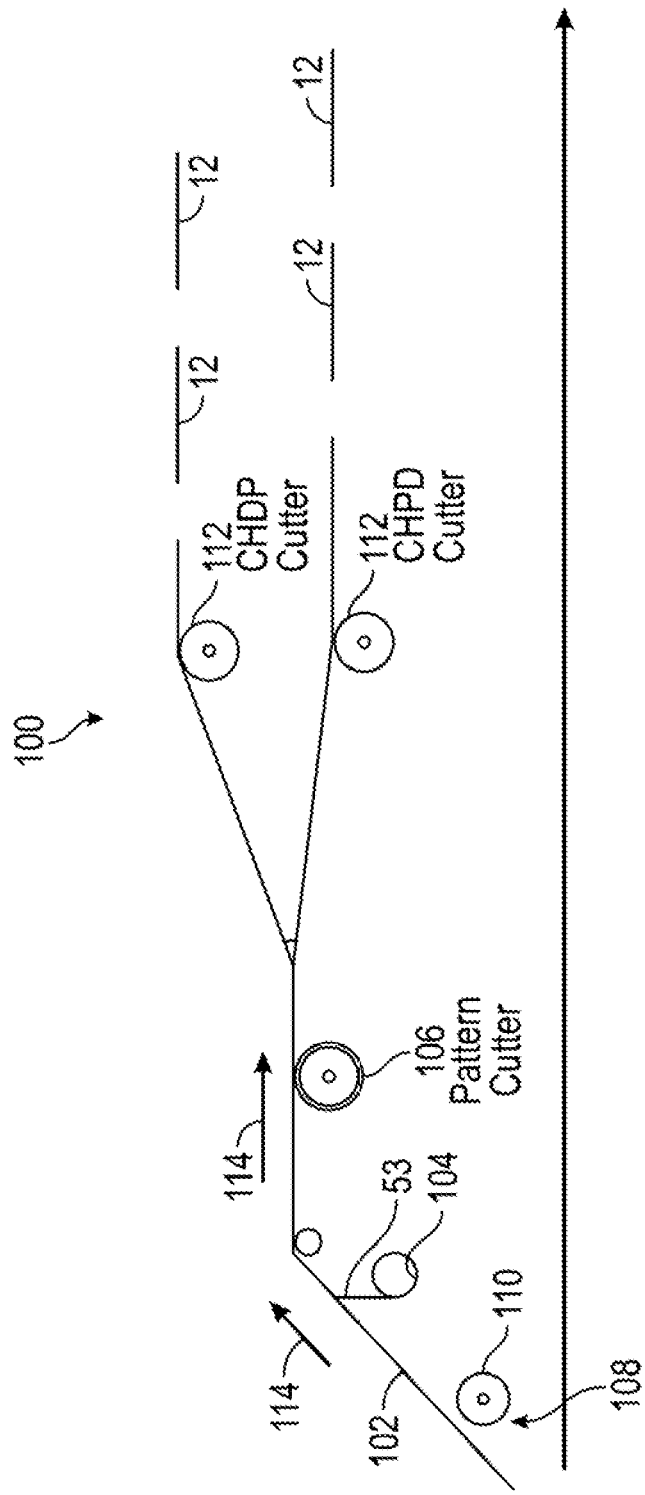
FIG. 3 is a schematic view of a production line for production of cap shingles according to principles of the present disclosure.
Figure 4:
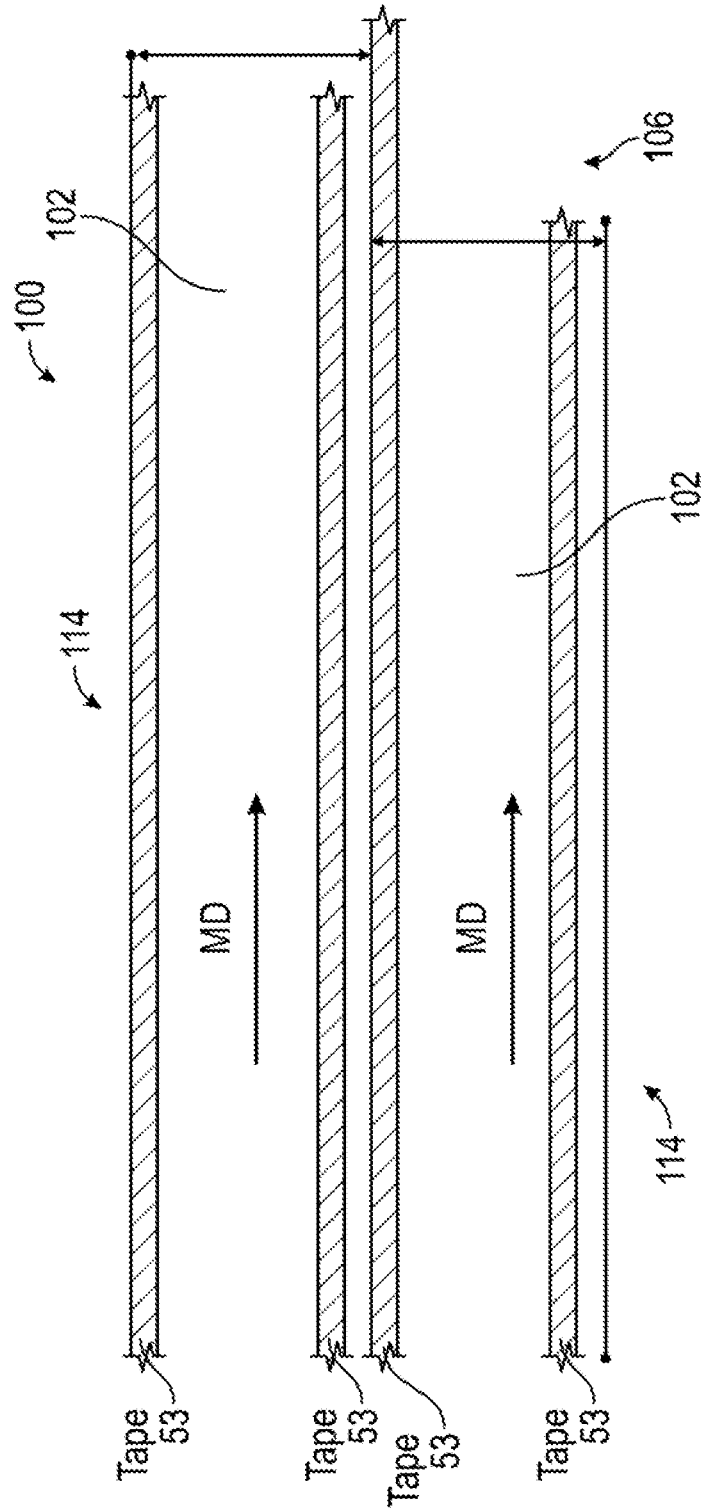
FIG. 4 is a plan view schematically illustrating a pattern cutter arrangement for forming a cap shingle according to principles of the present disclosure.
Figure 5:
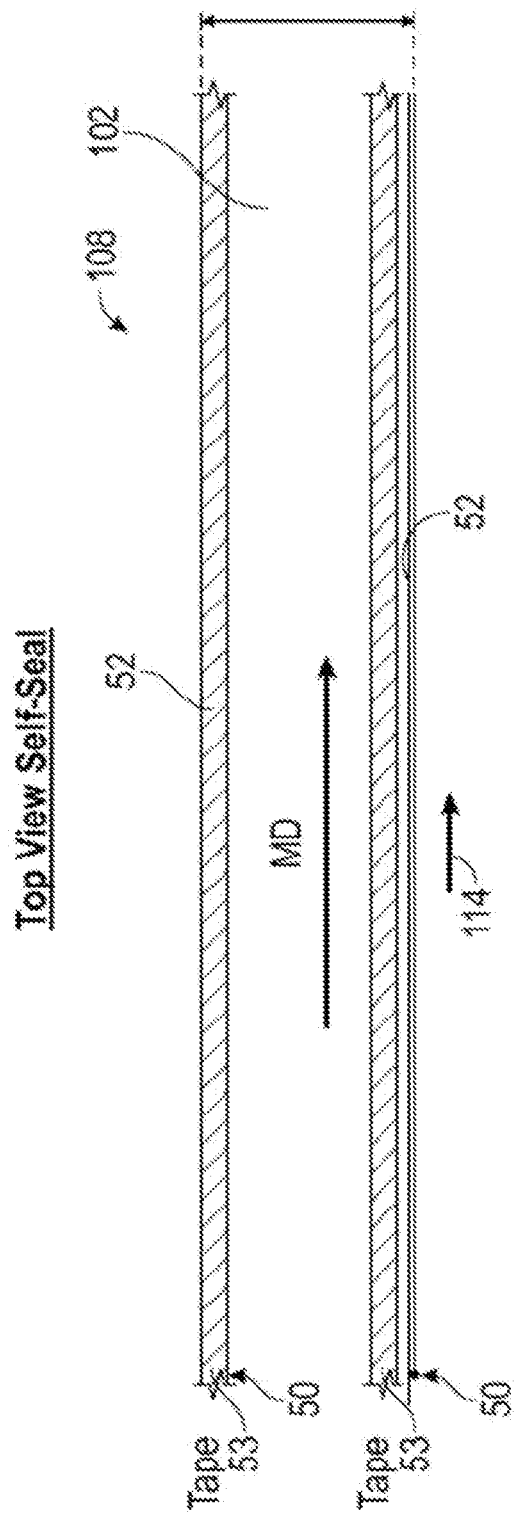
FIG. 5 is a plan view schematically illustrating application of the self-seal strip with a release tape applied thereover along the sheet of shingle material for forming the cap shingles according to principles of the present disclosure.

FIGS. 3-5 show various aspects of a production line or system 100 and methods of producing cap shingles. In one embodiment, a web of shingle material 102, having first and second surfaces, is moved along a processing path and continuous lines of adhesive are applied to form the self-seal strips 52 are both aligned in the same machine direction (MD). In embodiments, the web of shingle material 102 can include a fabric or other fibrous web or ribbon of shingle material. The machine direction applied self-seal strips 52 further will be aligned in the ridgeline direction (RD) (FIG. 1A) of the resultant cap shingles formed by the system 100 (FIGS. 3-5) when the cap shingles are installed along a roof ridge, cap or hip. While a single fabric web or layer of shingle material is illustrated, multiple layers of shingle materials, e.g., multiple fabric layers or webs, also can be used.

As indicated in FIG. 3, the system 100 can include a tape applicator 104, a pattern cutter 106, a self-sealing adhesive applicator 108, such as a self-sealing adhesive applicator wheel 110, and chop cutters 112. The web of a shingle material 102 (which can include a woven, non-woven or laminated fabric or a ribbon of shingle material) is moved along a path 114. The tape applicator 104 applies a length of the release tape 53 tape to the web of shingle material 102 (FIGS. 3-4) as the web of shingle material 102 is moved in the machine direction. The web of shingle material 102 moves into engagement with a pattern cutter 106, e.g., for cutting shingle patterns into the web of shingle material 102. The pattern cutter 106 is shown as a rotating drum, though other cutters also can be used.

Thereafter, the web of shingle material 102 moves along the self-sealing adhesive applicator wheel 110, which moves, e.g., spins, in sync with the movement of the web of shingle material 102 to apply the self-sealing adhesive 50 thereto, that is to form one or more self-seal strips 52 that have continuous or varying features along a length of the web of shingle material 102. In synchronization with the application of the self-sealing adhesive to a surface of the web of shingle material with the self-sealing adhesive applicator wheel 110, chop cutters 112 can be used to repeatedly cut the web of shingle material 102 for forming individual cap shingles. The self-sealing adhesive of the self-seal strips is applied adjacent each of the side edges of the web of shingle material in the machine direction, which generally will correspond to the ridgeline direction defining the axis about which the resultant cap shingles are bent for installation over a ridge, hip or cap of a roof; and thus is not required to be formed in registration with the engagement of the web of shingle material by the chop cutters, as compared to some types of cap shingles where the sealant dot locations require a precise cut by the chop cutter using registration marks to ensure correct placement.

For example, in embodiments, the chop cutters can fully cut through the web of shingle material to form individual cap shingles. In other embodiments, the cap shingles can be formed as sheets 8 (FIGS. 2A-2B) with the at least some of the chop cutters configured to engage the web of shingle material at intervals so as to form perforation or tear lines 121 along which the cap shingles of each sheet can be separated into individual cap shingles, as indicated in FIGS. 2A-2B, and with at least one downstream chop cutter configured to engage and cut the web of shingle material into separate sheets of cap shingles.

According to this process, the headlap 28 and exposure 26 portions of each cap shingle 12 can be in the same direction as the self-sealing adhesive 52, e.g., along the machine direction (MD) of the web of shingle material 102, such that the adhesives 52 can be applied on the sides of the cap shingle 12 in the machine direction. As a result, the cap shingles 12 can be bent in the same machine direction, and along the ridgeline direction (RD) (FIG. 1A) of the roof during installation of the cap shingles for a ridge application, which is in contrary to the existing products that are bent in the cross machine direction.

Also, it will be possible to make cap shingles 12 having one layer or multiple layers. The cap shingles 12 additionally can be produced along a production line, as indicated in FIGS. 3-5, without the need for registration of the application of the adhesive in the continuous or discontinuous patterns of the self-seal strips with the downstream pattern or chop cutter, which potentially can enable increased production rates. Further, this process can simplify the granule handling by allowing the same granules to be used in both the headlap 28 and the exposure 26 portions. Still further, this process can allow for creation of a color pattern or other aesthetic appearance of the cap shingles applied along the ridgeline of a roof that is consistent with the color pattern or aesthetic appearance of the other shingles covering the roof.

Figure 6:
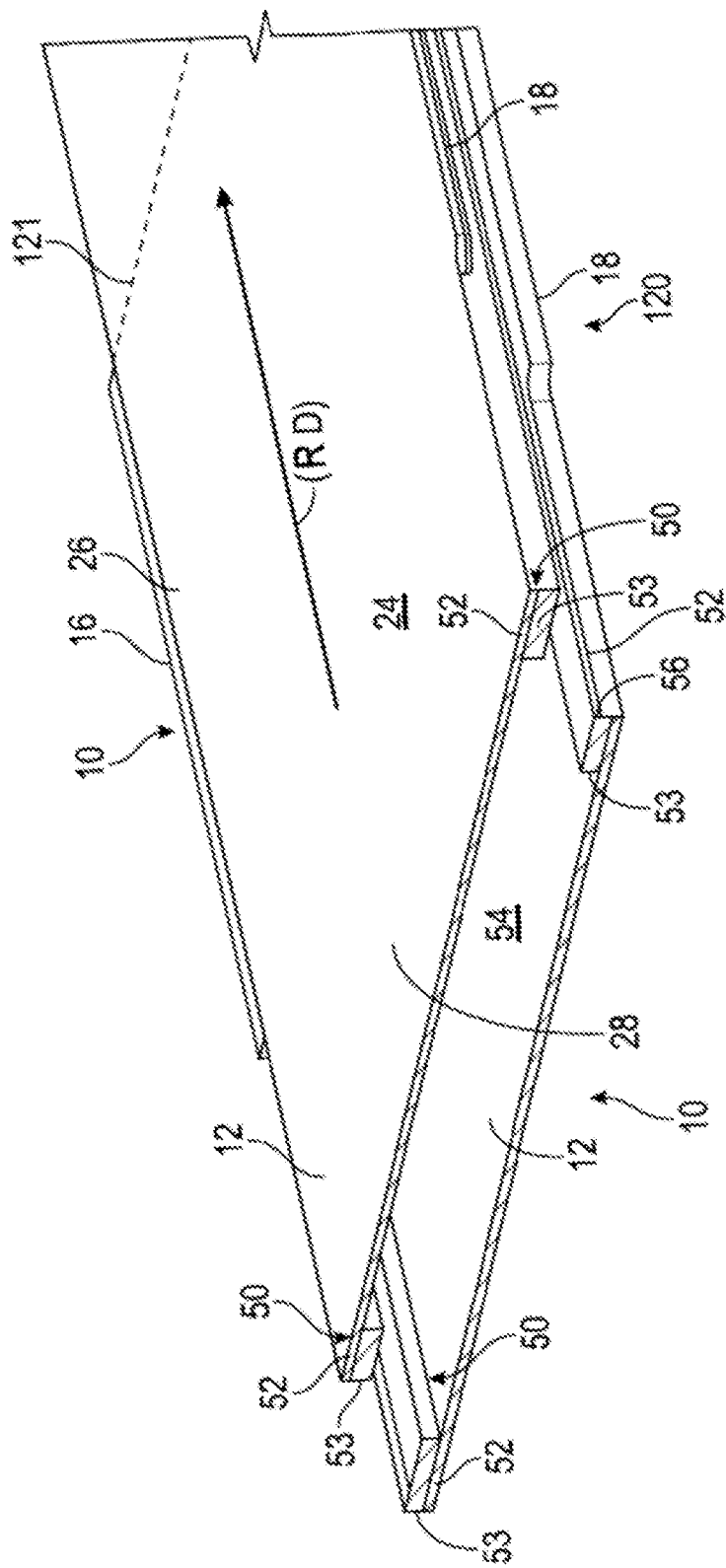
FIG. 6 is an end view illustrating stacking of the cap shingles of the present disclosure.

In addition, as shown in FIG. 6, the shingles 12 can be packaged in a packing process by flipping one of the shingle such that the location of the adhesives 52 and the release tape can be aligned when packed back to back. In this regard, the shingles 12 are stacked back to back to form a bundle 120 of stacked cap shingles 12 that is adapted to provide for easy release of the shingles from their stacked arrangement of the bundle. In addition, where sheets of multiple cap shingles are provided, each cap shingle 12 of each sheet of multiple cap shingles can be separated from the additional cap shingles of the sheet of multiple cap shingles by tearing along perforation or tear lines 121 in the short direction prior to installation.

In some embodiments, the present disclosure includes a bundle 120 of a plurality of cap shingles 12. For example, in embodiments, the present disclosure includes a bundle 120 of 1 number to 50 cap shingles 12; while in other embodiments, the bundle can include 1 to 40 cap shingles, 1 to 30 cap shingles, 1 to 20 cap shingles, 1 to 10 cap shingles, 5 to 50 cap shingles, 5 to 40 cap shingles, 5 to 30 cap shingles, 5 to 20 cap shingles, 5 to 10 cap shingles, 10 to 50 cap shingles, 15 to 50 cap shingles, 20 to 50 cap shingles, 25 to 50 cap shingles, 30 to 50 cap shingles, 35 to 50 cap shingles, 40 to 50 cap shingles, 45 to 50 cap shingles, and/or other sizes or configurations of bundles. In addition, the bundles of cap shingles can include a plurality of individual cap shingles stacked together, or, in embodiments, can include a plurality of sheets of multiple cap shingles stacked back-to-back as indicated in FIG. 6.

The present disclosure has been described herein in terms of examples that illustrate principles and aspects of the present disclosure. The skilled artisan will understand, however, that a wide gamut of additions, deletions, and modifications, both subtle and gross, may be made to the presented examples without departing from the spirit and scope of the present disclosure.

The invention claimed is:

1. A cap shingle comprising:
   a first layer of shingle material defining an upper surface of the cap shingle and having first and second side edges, a front edge, a back edge, an exposure portion, and a headlap portion adjacent the back edge;
   a second layer of shingle material positioned beneath the first layer;
   the second layer defining a lower surface of the cap shingle; wherein the first and second layers of shingle material are configured to bend in an arc along in a ridgeline direction extending from the back edge to the front edge for installation along a ridge, hip, or rake of a roof; and
   one or more strips of adhesive along the lower surface of the cap shingle;
   wherein the one or more strips of adhesive include a plurality of lines or dots of adhesive positioned adjacent the first side edge of the first layer of shingle material and a plurality of lines or dots of adhesive positioned adjacent the second side edge of the first layer of shingle material; and
   wherein the plurality of lines or dots of adhesive extend along the first and second side edges in the ridgeline direction of the cap shingle continuously between the front edge and the back edge.

2. The cap shingle of claim 1, wherein the one or more strips of adhesive comprise a self-sealing adhesive including asphalt, filled asphalt, polymer modified asphalts; bitumen, PSA, acrylic adhesives, butyl adhesives or combinations thereof.

3. The cap shingle of claim 1, wherein the one or more strips of adhesive comprise an additive including tackifiers, stabilizers, calcium carbonates, limestone fillers, graphites, intumescent additives, viscosity modified, oils, adhesion promoters, or combinations thereof.

4. The cap shingle of claim 1, wherein the one or more strips of adhesive comprise a self-seal adhesive having a tackiness at temperatures above 40° F.

5. The cap shingle of claim 1, wherein the cap shingles are configured to withstand wind uplift forces from high wind speeds of up to 110 mph.

6. The cap shingle of claim 1, wherein at least some of the one or more strips of adhesive comprise a discontinuous pattern of lines or dots of adhesive that vary along a length of each of the one or more strips of adhesive, and includes gaps or spaces defined between portions of the discontinuous pattern.

7. A roof comprising:
   a plurality of cap shingles arranged along a ridge, hip, or cap of the roof, each of the cap shingles comprising:
      at least one layer of shingle material including:
         an upper surface material including a headlap portion and an exposure portion;
         a lower surface; and
         a front edge, back edge and side edges; and
      strips of adhesive disposed along the lower surface of the at least one layer of shingle material;
      wherein the strips of adhesive are applied to the lower surface adjacent each of the side edges of the cap shingle, and each include a plurality of sealing features spaced along each of the first and second side edges of the cap shingle and extending along the first and second side edges in a ridgeline direction of the cap shingle continuously from the front edge to the back edge of the cap shingle;
   wherein the cap shingles are configured to bend along the ridgeline direction for installation of the cap shingles along the ridge, hip or cap of the roof, and are attached to the roof on opposite sides of the ridge, hip or cap.

8. The roof of claim 7, wherein at least some of the sealing features comprise lines or dots of adhesive that vary along a length of each strip of adhesive and have at least one gap therebetween; and wherein at least some of the sealing features include a self-sealing adhesive.

9. The roof of claim 7, wherein at least some of the sealing features comprise a dotted pattern of a self-seal adhesive extending adjacent each of the side edges of each cap shingle.

10. The roof of claim 7, wherein the strips of adhesive comprise a self-sealing adhesive, including asphalt, filled asphalt, polymer modified asphalts; bitumen, PSA, acrylic adhesives, butyl adhesives or combinations thereof.

11. The roof of claim 7, wherein the strips of adhesive comprise a plurality of sealing features including a substantially continuous strip of self-sealing adhesive, a discontinuous pattern of self-sealing adhesive, or combination thereof.

12. The roof of claim 7, wherein the cap shingles are configured to withstand wind speeds of up to 110 mph.

* * * * *